United States Patent [19]

Oyler

[11] 4,047,234
[45] Sept. 6, 1977

[54] LOW VOLTAGE PROTECTION CIRCUIT

[76] Inventor: Harry S. Oyler, 1004 St. Clair St., Manitowoc, Wis. 54220

[21] Appl. No.: 670,635

[22] Filed: Mar. 26, 1976

[51] Int. Cl.² .............................................. H02H 3/24
[52] U.S. Cl. ......................................... 361/92; 323/57
[58] Field of Search ..................... 317/31, 20; 323/57, 323/6, 43.5 R, 43.5 S, 48, 62, 66, 85; 340/248 B, 248 A, 248 C

[56] References Cited

U.S. PATENT DOCUMENTS

| | | | |
|---|---|---|---|
| 2,189,606 | 2/1940 | King | 323/62 |
| 2,617,913 | 11/1952 | Oestreicher | 323/62 X |
| 2,994,786 | 8/1961 | Pinney et al. | 323/43.5 R X |
| 3,195,036 | 7/1965 | McNulty et al. | 323/43.5 S X |
| 3,226,628 | 12/1965 | Kupferberg et al. | 323/43.5 S |
| 3,378,759 | 4/1968 | Eaves et al. | 323/43.5 S |

*Primary Examiner*—J D Miller
*Assistant Examiner*—Patrick R. Salce

[57] ABSTRACT

In a load-protection circuit operative with an alternating current voltage source and including circuit means for sensing an undervoltage conditon to control the voltage supplied to a load upon the occurrence of such a condition, the improvement includes a transformer which has input and output windings, and wherein the output winding has two output taps and at least one additional tap. The input winding is connected to the voltage source, and the load is connected across one of the output taps and the additional tap, the other tap and the addition tap being connected to the circuit means for causing the latter to switch the load from the additional tap to the other tap upon occurrece of the undervoltage condition. The voltage across the load is then substantially restored to a normal condition.

1 Claim, 2 Drawing Figures

U.S. Patent    Sept. 6, 1977    4,047,234

LOW VOLTAGE PROTECTION CIRCUIT

BACKGROUND OF THE INVENTION

1. Field of the Invention

The field of the invention relates to a low voltage protection circuit.

2. Description of the Prior Art

A load-protection circuit is known which is operative with a voltage source and includes circuit means for sensing an undervoltage condition to control the voltage supply to the load upon occurrence of the undervoltage condition. Such a control includes a trip circuit to cut off the supply voltage and/or an alarm to warn the user of the undervoltage condition. This necessarily results in an interruption of the operation of the device connected to the voltage source.

SUMMARY OF THE INVENTION

It is accordingly an objective of my present invention to both detect an undervoltage condition and to ensure that the device is connected to the voltage supply and continues to operate even though the voltage supply delivers a voltage below a normal voltage.

I accordingly provide in a load-protection circuit operative with an alternating current voltage source, and which has circuit means for sensing an undervoltage condition to control the voltage supplied to the load upon occurrence of the undervoltage condition a transformer which has input and output windings. The output winding of the transformer has two output taps and at least one additional tap, and the input winding is connected to the voltage source. The load is connected across one of the output taps and the additional tap; the other of the taps and the additional taps are connected to the circuit means for causing the latter to switch the load from the additional tap to the other tap upon occurrence of the undervoltage condition. The voltage across the load is thereby substantially restored to a normal condition.

The circuit means includes a rectifier connected across the alternating current source for providing a direct current potential, a resistor in series with a zener diode connected across the direct current potential, a potentionmeter shunted across the direct current potential for providing a variable direct-current voltage output, and a difference amplifier which has two inputs and output terminals, respectively. The input terminals of the difference amplifier are connected across the junction of the resistor and the zener diode, and the variable direct-current voltage output, respectively. The circuit means further includes a relay which has a winding and single-pole double-throw contacts, where the winding is connected across the output terminals of the difference amplifier, the single pole contact is connected to one of the terminals of the load, and one of the double throw contacts is connected to the additional tap, the other of the double throw contacts being connected to the other of the taps.

BRIEF DESCRIPTION OF THE DRAWING

My invention will be better understood with reference to the accompanying drawing in which.

DESCRIPTION OF THE PREFERRED EMBODIMENT

Figure 1:
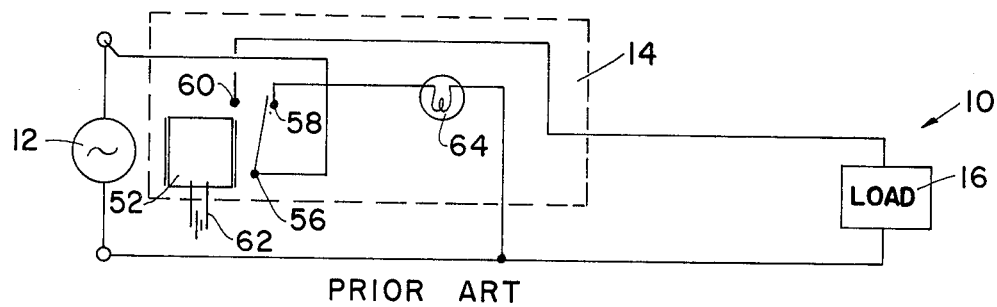
FIG. 1 shows a load protection circuit of the prior art.

Referring now to FIG. 1 of the drawing which shows a load protection circuit of the prior art, the protection circuit 10 is operative with an alternating voltage source 12, it includes circuit means 14 for sensing an undervoltage condition. The circuit means 14 includes a relay 52 connected to a source of d.c. potential 62; the relay 52 has a single pole contact 56 and double throw contacts 60 and 58. A bulb or warning device 64 is connected in series with the single pole 56 and one terminal of the voltage source 12. The realy 52 trips in the event of an undervoltage condition of the voltage supply 12 and thus breaks the connection to the load 16, which in turn results in a lighting of the bulb 64. The voltage supply to the load 16 is now interrupted until such time as the voltage source 12 resumes normal operation.

Figure 2:
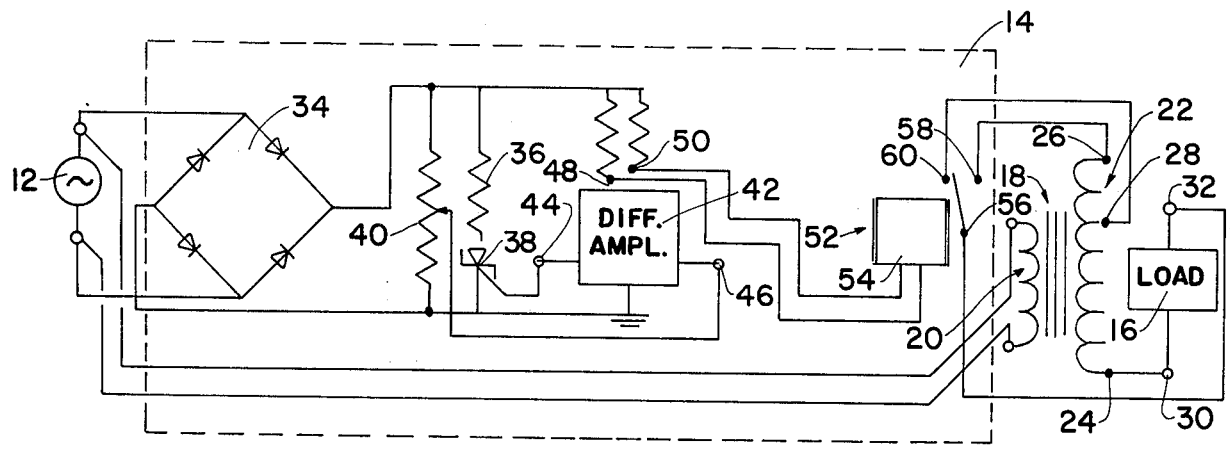
FIG. 2 shows the load protection circuit according to my present invention.

The improvement according to my invention is shown in FIG. 2. A transformer 18 has an input winding 20 and an output winding 22. The output winding 22 has two output taps, i.e. tap 24 and tap 26, disposed at respective ends thereof, and at least one additional tap 28 disposed in between the input and output taps 24 and 26. The input winding 20 is connected to the voltage source 12, and the load 16 is normally connected across the tap 24 and the tap 28. The tap 26 and the tap 28 are connected to the circuit means 14 as will be explained later, for causing the latter to switch the load 16 from the additional tap 28 to the other tap 26 upon occurrence of the undervoltage condition; the voltage across the load 16 is then substantially restored to a normal condition.

The circuit means 14 include a rectifier 34 which is connected across the alternating voltage source 12 for providing a direct current potential. A resistor 36 in series with a zener diode 38 and a potentiometer 40 are connected in a bridge configuration across the direct potential supplied by the rectifier 34. The variable tap output of the potentiometer 40 and the junction of the resistor 36 and the zener diode 38 are connected, respectively, to the inputs of a difference amplifier 42. Since there is always a constant voltage drop across the zener diode 38, whereas the voltage drop across the potentiometer 40, or a fraction thereof varies, the potential difference between the junction of the resistor 36 and the zener diode 38 on one hand, and the variable voltage tap on the potentionmeter 40 on the other hand, will provide an indication of any undervoltage, or overvoltage condition; the potentiometer 40 is then set for a desired undervoltage condition. The difference amplifier 42 thus accepts the potential existing on one hand on the variable tap of the potentiometer 40 and on the other hand the potential existing across the junction of the resistor 36 and the zener diode 38 and provides an amplified difference potential across the output terminals 48 and 50. The output terminals 48 and 50 are connected to a winding 54 of a relay 52. The relay 52 has a single pole contact 56 and double throw contacts 58 and 60. The single pole contact 56 is connected to the terminal 32 of the load 16, and the double throw contact 60 is connected to the additional tap 28 of the transformer 18, the double throw contact 58 being connected to the tap 26. Upon occurrence of an undervoltage condition across the voltage source 12 the terminal 32 of the load is connected to the terminal 26 of the output winding 22, thus restoring the voltage across the load to a substantially normal condition. As soon as the undervoltage ceases, the relay 52 causes the pole 56 to be connected to the contact 58 and thus reconnects the terminal 32 of the load to the tap 28 of the winding 22 of the transformer 18.

I claim:

1. In a load-protection circuit operative with an alternating-current voltage-source including circuit means for sensing an undervoltage condition to control the voltage supplied to the load upon occurrence of said undervoltage condition, the improvement comprising:

a transformer having input and output windings, said output winding having two output taps and at least one additional tap, said input winding being connected to said voltage source, the load being connected across one of said output taps and said additional tap, the other of said taps and said additional tap being connected to said circuit means for causing the latter to switch the load from said additional tap to said other of said taps upon occurrence of said undervoltage condition, wherein the load has two terminals and said circuit means further includes:

a rectifier connected across said alternating current voltage source for providing a direct-current potential;

a resistor in series with a zener diode connected across said direct-current potential;

a potentiometer shunted across said direct current potential for providing a variable direct-current voltage output;

a difference amplifier having two inputs and output terminals, respectively, said input terminals being connected across the junction of said resistor and said zener diode, and said variable direct-current voltage output, respectively; and a relay having a winding and two single pole, double throw contacts, said winding being connected across said output terminals, said single pole contact being connected to one of said terminals of said load, one of said double throw contacts being connected to said additional tap, the other of said double throw contacts being connected to said other of said taps, whereby the voltage across the load is substantially restored to a normal condition.

* * * * *